United States Patent
Hu et al.

(10) Patent No.: US 12,106,062 B2
(45) Date of Patent: Oct. 1, 2024

(54) METHOD AND APPARATUS FOR GENERATING A TEXT, AND STORAGE MEDIUM

(71) Applicant: BEIJING BAIDU NETCOM SCIENCE TECHNOLOGY CO., LTD., Beijing (CN)

(72) Inventors: Zhe Hu, Beijing (CN); Zhiwei Cao, Beijing (CN); Jiachen Liu, Beijing (CN); Xinyan Xiao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 363 days.

(21) Appl. No.: 17/572,930

(22) Filed: Jan. 11, 2022

(65) Prior Publication Data

US 2022/0138435 A1     May 5, 2022

(30) Foreign Application Priority Data

Jun. 30, 2021   (CN) .......................... 202110731989.3

(51) Int. Cl.
*G06F 40/00*        (2020.01)
*G06F 40/40*        (2020.01)

(52) U.S. Cl.
CPC ................................... *G06F 40/40* (2020.01)

(58) Field of Classification Search
CPC ........ G06F 40/40; G06F 40/56; G06F 40/117; G06F 40/126; G06F 40/242; G06F 40/30; G06F 40/53; Y02D 10/00
See application file for complete search history.

(56) References Cited

U.S. PATENT DOCUMENTS

| | | | | |
|---|---|---|---|---|
| 2018/0349303 | A1* | 12/2018 | Hamada | G06N 3/044 |
| 2019/0057081 | A1* | 2/2019 | Choi | G06F 40/56 |
| 2019/0259036 | A1* | 8/2019 | Chakraborty | G06N 3/044 |
| 2020/0356729 | A1* | 11/2020 | Duan | G06N 3/08 |

FOREIGN PATENT DOCUMENTS

| | | | |
|---|---|---|---|
| CN | 106528858 | A | 3/2017 |
| CN | 108062388 | A | 5/2018 |
| CN | 109670185 | A | 4/2019 |
| JP | 2018180720 | A | 11/2018 |

OTHER PUBLICATIONS

Office Action for Chinese Application No. 202110731989.3, dated May 17, 2023, 19 pages.
Office Action for Japanese Application No. 2022-048414, dated May 9, 2023, 8 pages.

* cited by examiner

*Primary Examiner* — Douglas Godbold
*Assistant Examiner* — Parker Mayfield
(74) *Attorney, Agent, or Firm* — Lippes Mathias LLP

(57) ABSTRACT

The disclosure provides a method for generating a text. The method includes: obtaining a coding sequence of a first text by coding the first text; obtaining a controllable attribute of a second text to be generated; predicting a hidden state of the second text based on the coding sequence of the first text and the controllable attribute of the second text; and obtaining a second text corresponding to the first text by decoding the coding sequence of the first text based on the hidden state of the second text.

11 Claims, 4 Drawing Sheets

METHOD AND APPARATUS FOR GENERATING A TEXT, AND STORAGE MEDIUM

CROSS-REFERENCE TO RELATED APPLICATION

The present application is based upon and claims priority to Chinese Patent Application No. 202110731989.3, filed on Jun. 30, 2021, the entirety contents of which are incorporated herein by reference.

TECHNICAL FIELD

The disclosure relates to the field of data processing technology, specifically to the field of natural language processing technology, and in particular to a method for generating a text, an apparatus for generating a text, and a storage medium.

BACKGROUND

Controllable text generation is a way of generating a text based on desired controllable attributes, such as emotional tendency, statement length, content specificity degree and language style type.

SUMMARY

Embodiments of the disclosure provide a method for generating a text, an apparatus for generating a text, and a storage medium.

Embodiments of the disclosure provide a method for generating a text. The method includes: obtaining a coding sequence of a first text by coding the first text; obtaining a controllable attribute of a second text to be generated; predicting a hidden state of the second text based on the coding sequence of the first text and the controllable attribute of the second text; and obtaining a second text corresponding to the first text by decoding the coding sequence of the first text based on the hidden state of the second text.

Embodiments of the disclosure provide an apparatus for generating a text. The apparatus includes: at least one processor and a memory communicatively connected with the at least one processor, in which the memory stores instructions executable by the at least one processor, and the at least one processor is configured to: obtain a coding sequence of a first text by coding the first text; obtain a controllable attribute of a second text to be generated; predict a hidden state of the second text based on the coding sequence of the first text and the controllable attribute of the second text; and obtain a second text corresponding to the first text by decoding the coding sequence of the first text based on the hidden state of the second text. Embodiments of the disclosure provide a non-transitory computer-readable storage medium storing computer instructions. The computer instructions are configured to cause the computer to execute the method according to the present disclosure. The method includes: obtaining a coding sequence of a first text by coding the first text; obtaining a controllable attribute of a second text to be generated; predicting a hidden state of the second text based on the coding sequence of the first text and the controllable attribute of the second text; and obtaining a second text corresponding to the first text by decoding the coding sequence of the first text based on the hidden state of the second text.

It should be understood that the content described in this section is not intended to identify the key or important features of the embodiments of the disclosure, nor is it intended to limit the scope of the disclosure. Additional features of the disclosure will be easily understood through the following description.

BRIEF DESCRIPTION OF THE DRAWINGS

The drawings are used to better understand the solution and do not constitute a limitation of the disclosure, in which.

DETAILED DESCRIPTION

The exemplary embodiments of the disclosure are described below in combination with the accompanying drawings, which include various details of the embodiments of the disclosure to aid in understanding, and should be considered merely exemplary. Therefore, those skilled in the art should know that various changes and modifications can be made to the embodiments described herein without departing from the scope and spirit of the disclosure. For the sake of clarity and brevity, descriptions of well-known features and structures have been omitted from the following description.

A method for generating a text, an apparatus for generating a text, an electronic device and a storage medium of embodiments of the disclosure are described below with reference to the accompanying drawings.

In the related art, in order to make the generated text meet the required controllable attribute, generally, the second text is determined based on the output of a translation model by splicing the first text with the controllable attribute and inputting into a translation model. In this way, the training requirement for the translation model is high, and the translation model needs to learn to get the mapping relationship between the input first text and the second text that matches the controllable attribute. It is difficult for the translation model to learn this complicated mapping relationship, thus the generation quality of the second text in the actual operation is not high.

In the disclosure, in order to avoid the translation model directly learning this complicated mapping relationship, the learning goals are split into the two goals of high-quality response and satisfaction of controllable attributes respectively. After the first text is encoded, the coding sequence of the first text and the controllable attribute are decoded to obtain the hidden state of the second text, so that the hidden state of the second text conforms to the controllable attribute. Next, the hidden state that conforms to the controllable attribute and the coding sequence of the first text are decoded, so that the decoded second text is semantically a response to the first text.

Figure 1:
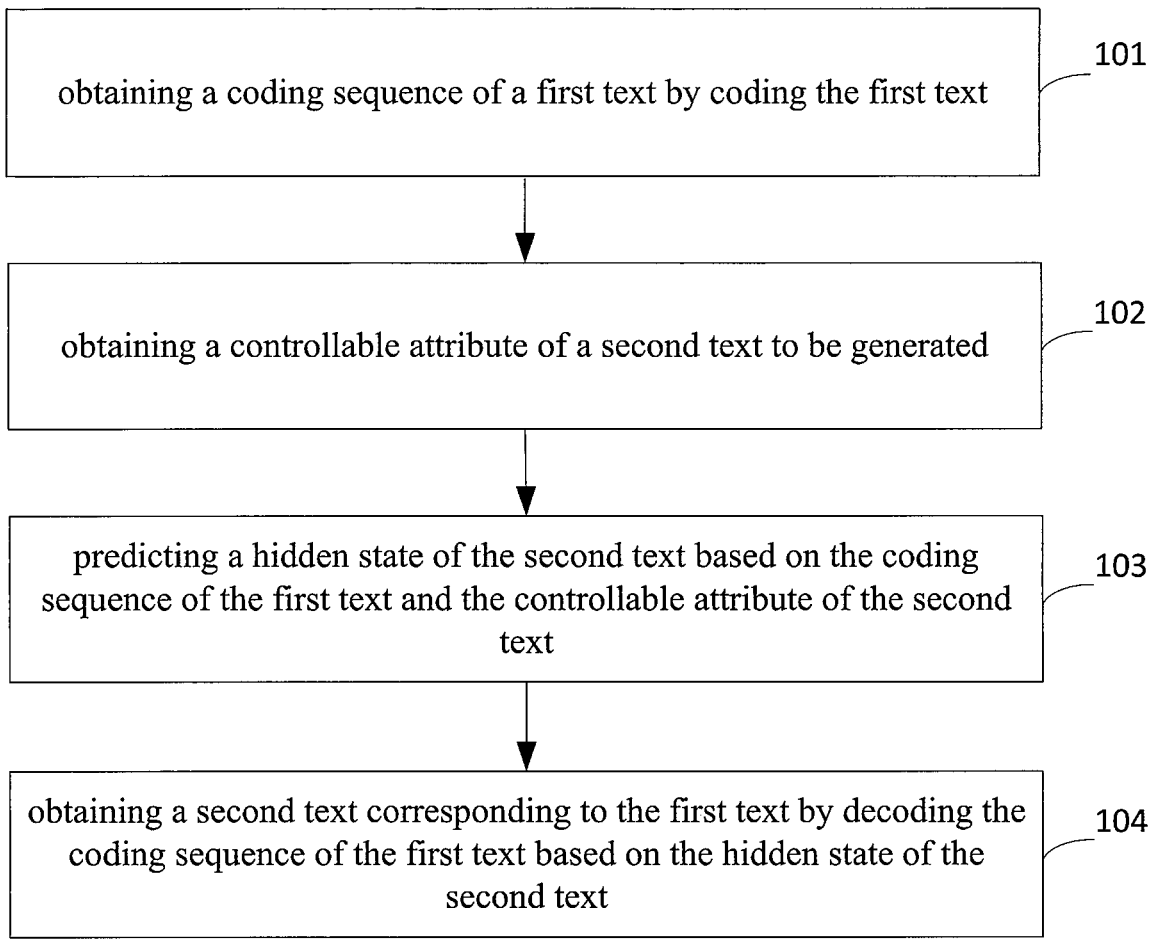
FIG. 1 is a flowchart of a method for generating a text according to an embodiment of the disclosure.

FIG. 1 is a flowchart of a method for generating a text according to an embodiment of the disclosure.

As shown in FIG. 1, the method includes the following steps.

In step 101, a coding sequence of a first text is obtained by coding the first text.

In step 102, a controllable attribute of a second text to be generated is obtained.

As a first possible implementation, the target value of the controllable attribute is determined by a user operation.

As a second possible implementation, after obtaining the coding sequence of the first text by encoding the first text, the target value is obtained by predicting the controllable attribute based on the coding sequence of the first text.

It should be noted that, in different scenarios, the first possible implementation or the second possible implementation is executed, or user operation is not detected in the first possible implementation, or the second possible implementation is executed in the case where the target value cannot be determined based on the user operation.

Based on the two possible implementations, it can be seen that the controllable attribute may be input by the user manually or automatically, so that the method for generating a text is more flexible and can meet different user requirements.

In step 103, a hidden state of the second text is predicted based on the coding sequence of the first text and the controllable attribute of the second text.

The hidden state of the second text conforms to the controllable attribute, in other words, the hidden state of the second text carries the controllable attribute.

In step 104, a second text corresponding to the first text is obtained by decoding the coding sequence of the first text based on the hidden state of the second text.

Figure 2:
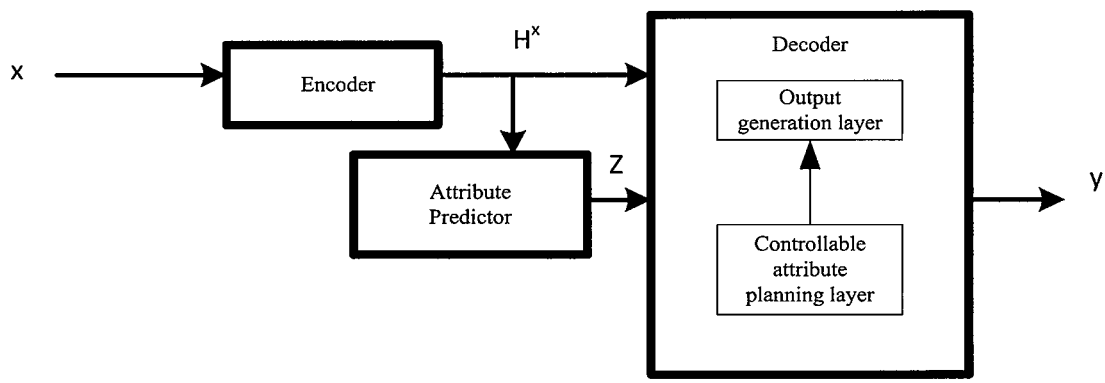
FIG. 2 is a framework diagram of a text generation model.

In order to clearly explain this embodiment, this embodiment provides the framework of a text generation model shown in FIG. 2. As shown in FIG. 2, the first text is labeled as x and is encoded by the encoder to obtain a coding sequence $H^x$ of the first text. The coding sequence $H^x$ of the first text is input to an attribute predictor, to predict the controllable attribute z of the second text based on the coding sequence $H^x$ of the first text by the attribute predictor. Furthermore, the coding sequence $H^x$ and the controllable attribute z of the second text are input into the decoder for decoding, and the second text y corresponding to the first text is obtained.

The decoding process of the decoder shown in FIG. 2 can be divided into two stages.

The first stage is executed in a controllable attribute planning layer in FIG. 2, and the hidden state $H^z$ of the second text is predicted based on the coding sequence $H^x$ of the first text and the controllable attribute z of the second text.

The second stage is executed in an output generation layer in FIG. 2. According to the hidden state $H^z$ of the second text, the coding sequence $H^x$ of the first text is decoded to obtain the second text y corresponding to the first text.

Before using the text generation model in FIG. 2 to generate the second text, the text generation model needs to be trained. The following is a brief description of the training process of the text generation model.

Firstly, training samples are prepared. The training samples are intercepted from the first text of a statement and labeled in the second text correspondingly, and the controllable attribute of the second text is manually labeled, where the labeled controllable attribute includes values of global attributes and local attributes of each character.

Secondly, the training sample is input to the text generation model, and the text generation model is trained based on differences between the controllable attributes predicted by the text generation model for the training samples and the labeled controllable attributes, and the differences between the second text predicted by the text generation model and the labeled second text.

In this embodiment, the coding sequence of the first text and the controllable attribute are decoded to obtain the hidden state of the second text, and the hidden state of the second text is consistent with the controllable attribute. The decoding of the hidden state conforming to the controllable attribute and the coding sequence of the first text are carried out in the next step, and the decoded second text is semantically a reply to the first text. By splitting the process of generating the second text into two steps, the hidden state of the second text generated in the first step conforms to the controllable attribute. On the basis, the decoding step is performed, so that the decoded second text is semantically a reply to the first text, and the above controllable attribute is retained at the same time. In the related art, the first text and the controllable attribute are input to the model together to obtain the second text output by the model, this approach makes the splicing of the first text and the controllable attribute and the mapping relationship of the second text complex, so that the generation quality of the second text is not high. In this embodiment, the complex mapping process is split into a two-step simple process, which results in an improved quality of the generation of the second text.

Based on the above embodiments, the embodiment provides an implementation that divides the controllable attributes into global attributes and local attributes. In the related art, the controllable attributes are not divided into global attributes and local attributes. In this embodiment of the disclosure, the division of global and local attributes is made based on the impact of controllable attributes on the second text from different granularity. Global attributes are attributes that are reflected in the sentence as a whole, so that values of the global attributes of each character in the second text are the same. Local attributes are attributes embodied in each character in a sentence, and values of the local attributes of different characters in the second text are different, that is, each character has a corresponding value of the local attribute. In this embodiment, global attributes and local attributes are described separately.

Figure 3:
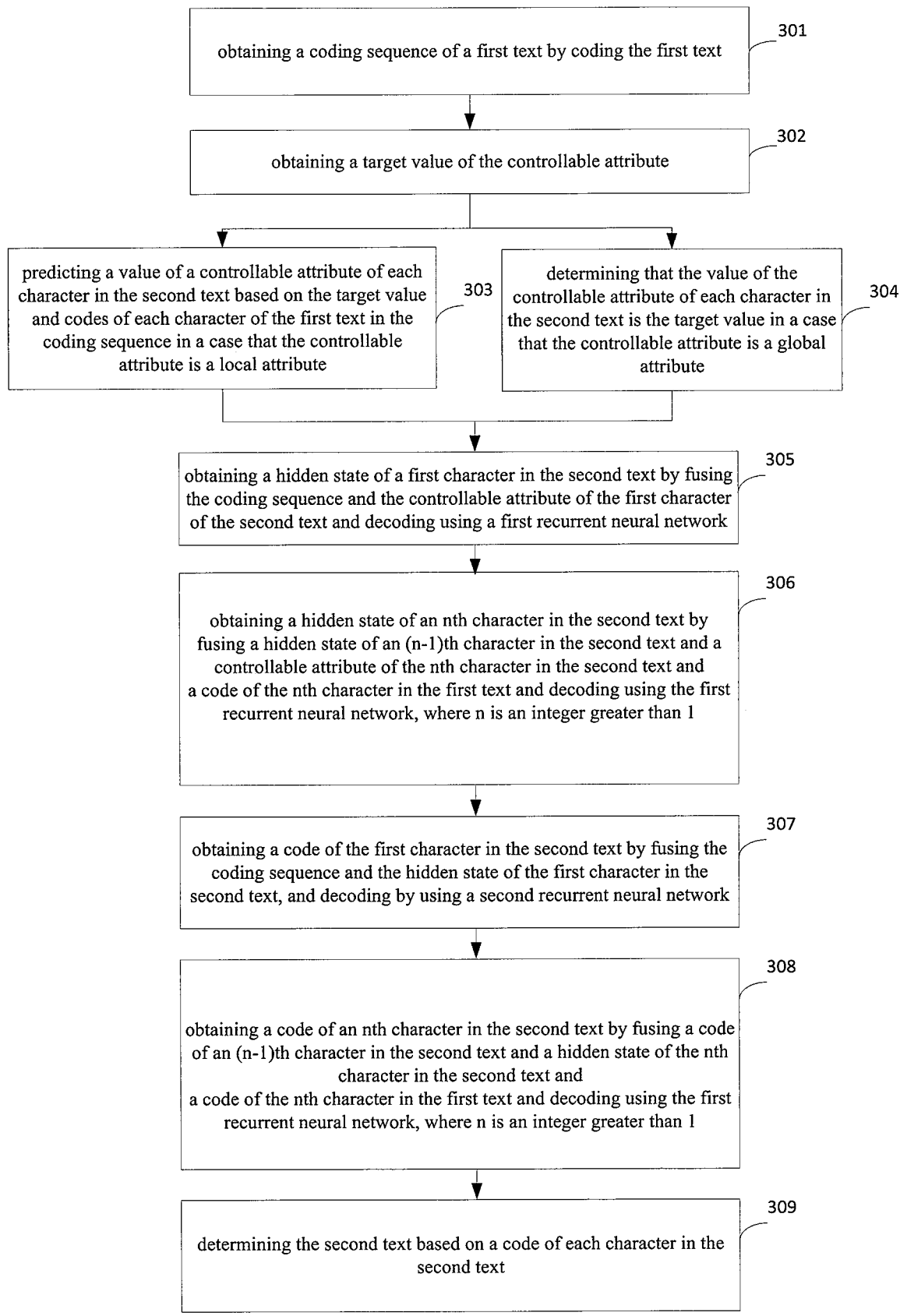
FIG. 3 is a flowchart of a method for generating a text according to an embodiment of the disclosure.

FIG. 3 is a flowchart of a method for generating a text according to an embodiment of the disclosure. As shown in FIG. 3, the method includes the following steps.

In step 301, a coding sequence of a first text is obtained by coding the first text.

The first text is input to the encoder for encoding, and the coding sequence of the first text is obtained. The coding sequence of the first text includes a plurality of codes in the form of vectors, and each encode corresponds to a character in the first text, i.e., each character in the first text has a corresponding code.

In step 302, a target value of the controllable attribute is obtained.

As a first possible implementation, the target value of the controllable attribute is determined by a user operation.

As a second possible implementation, after coding the first text and obtaining the coding sequence of the first text, the target value is obtained by predicting the controllable attribute based on the coding sequence of the first text.

It should be noted that, in different scenarios, the first possible implementation or the second possible implementation is executed, or user operation is not detected in the first possible implementation, or the second possible implementation is executed in the case where the target value cannot be determined based on the user operation.

Based on the two possible implementations, it can be seen that the controllable attribute may be input by the user manually or automatically, so that the method for generating a text is more flexible and can meet different user requirements.

In step 303, a value of a controllable attribute of each character in the second text is predicted based on the target value and codes of each character of the first text in the coding sequence in a case that the controllable attribute is a local attribute.

Local attributes are controllable attributes for attribute control of each character of the second text. For example, local attributes can include content specificity degree and emotional tendency.

However, it is more complicated for the user to specify the value of the local attributes for each character in the second text, in order to simplify the user operation, it is necessary to predict the value of the controllable attribute for each character in the second text. In the embodiment of the disclosure, the user can specify only one target value of the local attribute, and predict the value of the local attribute of each character in the second text based on the target value.

Optionally, the target value and the coding sequence in first text are fused and input into a third recurrent neural network to obtain the value of the controllable attribute of the first character in the second text. Furthermore, the value of the controllable attribute of the $(n-1)^{th}$ character in the second text and the target value, and the coding sequence of the first text are fused, and input into the third recurrent neural network for decoding, to obtain the value of the controllable attribute of the $n^{th}$ character in the second text.

In step 304, it is determined that the value of the controllable attribute of each character in the second text is the target value in a case that the controllable attribute is a global attribute.

Global attributes are controllable attributes for attribute control from the sentence as a whole. For example, global attributes can include sentence length and language style type. Therefore, the values of the available attributes of the characters in the second text are all determined as the target values, which can make the generated sentence style uniform.

In step 305, a hidden state of a first character in the second text is obtained by fusing the coding sequence and the controllable attribute of the first character of the second text and decoding using a first recurrent neural network.

Optionally, the coding sequence of the first text and the controllable attribute of the first character in the second text are directly spliced, or weighted and summed, to obtain the input vector of the first recurrent neural network. After inputting the input vector into the first training neural network, the hidden state of the first character in the second text is decoded by the first recurrent neural network. The hidden state output by the first recurrent neural network carries relevant information of controllable attributes, but does not carry the semantic reply to the first text.

In step 306, a hidden state of an $n^{th}$ character in the second text is obtained by fusing a hidden state of an $(n-1)^{th}$ character in the second text and a controllable attribute of the $n^{th}$ character in the second text and a code of the $n^{th}$ character in the first text, and decoded using the first recurrent neural network, where n is an integer greater than 1.

After the first recurrent neural network outputs the hidden state of the first character in the second text, based on the hidden state, the controllable attributes of the corresponding subsequent characters in the second text below, and the coding sequence of the first text, decoding of subsequent characters in the second text is continued.

In step 307, a code of the first character in the second text is obtained by fusing the coding sequence and the hidden state of the first character in the second text, and decoding by using a second recurrent neural network.

Optionally, since the code corresponding to the last character of the first text in the coding sequence generally carries the semantics of the entire first text, the coding sequence corresponding to the last character in the first text and the hidden state of the first character in the first text are fused and input into the second recurrent neural network for decoding, to obtain the code of the first character in the second text.

In step 308, a code of the $n^{th}$ character in the second text is obtained by fusing a code of the $(n-1)^{th}$ character in the second text, the hidden state of the $n^{th}$ character in the second text and the code of the $n^{th}$ character in the first text, and decoding by using the second recurrent neural network.

In step 309, the second text is determined based on a code of each character in the second text.

The coding of each character in the second text indicates the probability that each character in the dictionary is in the second text, and the content of the character at the position of the character in the second text is determined from the dictionary based on the probability.

Figure 4:
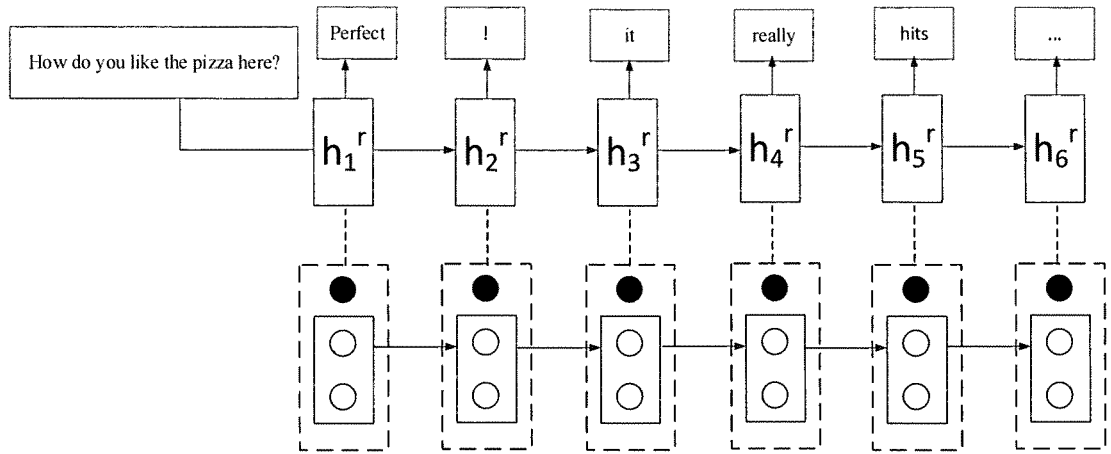
FIG. 4 is a schematic diagram of generating a second text.

In order to clearly illustrate this embodiment, this embodiment also provides a schematic diagram of generating the second text shown in FIG. 4.

As shown in FIG. 4, the first text like "How do you like the pizza here?" is input, and each character in the second text has a corresponding control attribute. The control attribute includes local attributes and global attributes. Local attributes are identified by hollow circles, and global attributes are identified by solid circles. Based on the control attributes of the characters in the second text and the coding sequence of the first text, the hidden state $h_n^z$ of the character in the second text is obtained, where n is a positive integer, which indicates the sequence or position number of the corresponding characters in the second text. The code $h_n^r$ of the second text is obtained by decoding based on the hidden state $h_n^z$ of each character in the second text, and the coding sequence of the first text. According to the code $h_n^r$ of the second text, the final second text such as "Perfect! It really hits . . . " is obtained.

In this embodiment, the coding sequence of the first text and the controllable attributes are decoded to obtain the hidden state of the second text, so that the hidden state of the second text conforms to the controllable attribute. Then the next step is to decode the hidden state that conforms to the controllable attribute and the coding sequence of the first text, so that the decoded second text is semantically a response to the first text. By splitting the generation process of the second text into two steps, the hidden state of the second text generated in the first step is consistent with the controllable attribute. Based on this, the next step of decoding is performed, so that the decoded second text is semantically a reply to the first text, while retaining the above controllable attributes, which improves the generation quality of the second text. At the same time, different processing is performed for local attributes and global attributes to determine the value of each character corresponding to the controllable attribute in the second text, which further improves the generation quality of the second text.

Figure 5:
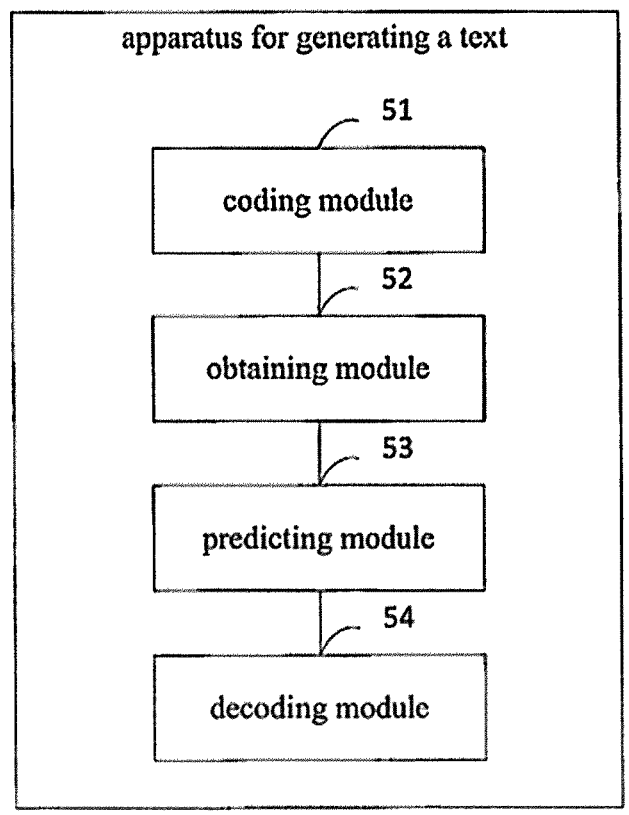
FIG. 5 is a schematic diagram of an apparatus for generating a text according to an embodiment of the disclosure.

FIG. 5 is a schematic diagram of a structure of an apparatus for generating a text according to an embodiment of the disclosure. As shown in FIG. 5, the apparatus includes: an encoding module 51, an obtaining module 52, a predicting module 53, and a decoding module 54.

The coding module 51 is configured to obtain a coding sequence of a first text by coding the first text. The obtaining module 52 is configured to obtain a controllable attribute of a second text to be generated. The predicting module 53 is configured to predict a hidden state of the second text based on the coding sequence of the first text and the controllable attribute of the second text. The decoding module 54 is configured to obtain a second text corresponding to the first text by decoding the coding sequence of the first text based on the hidden state of the second text.

In a possible implementation, the obtaining module 52 includes: an obtaining unit and a predicting unit.

The obtaining unit is configured to obtain a target value of the controllable attribute.

The predicting unit is configured to predict a value of a controllable attribute of each character in the second text based on the target value and codes of each character of the first text in the coding sequence in a case that the controllable attribute is a local attribute.

In a possible implementation, the obtaining module 52 includes: a determining unit, configured to determine that the value of the controllable attribute of each character in the second text is the target value in a case that the controllable attribute is a global attribute.

In a possible implementation, the obtaining unit is configured to: determine the target value of the controllable attribute by a user operation; or obtain the target value by predicting the controllable attribute based on the coding sequence of the first text.

In a possible implementation, the predicting module 53 includes: a first decoding unit and a second decoding unit.

The first decoding unit is configured to obtain a hidden state of a first character in the second text by fusing the coding sequence and the controllable attribute of the first character of the second text and decode using a first recurrent neural network.

The second decoding unit is configured to obtain a hidden state of an $n^{th}$ character in the second text by fusing a hidden state of an $(n-1)^{th}$ character in the second text and a controllable attribute of the $n^{th}$ character in the second text, and decode using the first recurrent neural network, where n is an integer greater than 1.

In a possible implementation, the decoding module 54 includes: a third decoding unit, a fourth decoding unit and an outputting unit.

The third decoding unit is configured to obtain a code of the first character in the second text by fusing the coding sequence and the hidden state of the first character in the second text, and decoding by using a second recurrent neural network.

The fourth decoding unit is configured to obtain a code of the $n^{th}$ character in the second text by fusing the coding sequence of the first text, the hidden state of the $n^{th}$ character in the second text and a code of the $(n-1)^{th}$ character in the second text, and decoding by using the second recurrent neural network.

The outputting unit is configured to determine the second text based on a code of each character in the second text.

In a possible implementation, the predicting unit is further configured to: obtain a value of the controllable attribute of a first character in the second text by fusing the target value and the coding sequence of the first text, and inputting into a third recurrent neural network; and obtain a value of the controllable attribute of the $n^{th}$ character in the second text by fusing the value of the controllable attribute of the $(n-1)^{th}$ character in the second text, the target value and the coding sequence of the first text, and decoding by the third recurrent neural network.

With the apparatus according to the embodiment, after obtaining a coding sequence by coding the first text, a hidden state of the second text is obtained by decoding the coding sequence of the first text and a controllable attribute, so that the hidden state of the second text is consistent with the controllable attribute. Then, decoding is performed on the hidden state conforming to the controllable attribute and the coding sequence of the first text, so that the decoded second text is semantically a reply to the first text. By splitting the generation process of the second text into two steps, the hidden state of the second text generated in the first step conforms to the controllable attribute. On the basis, decoding is performed, so that the decoded second text is semantically a reply to the first text and conforms to the controllable attribute, and the generation quality of the second text is improved.

It is noted that the foregoing explanatory description of the method embodiment is also applicable to the apparatus of this embodiment, the same principle is the same, which is not limited in this embodiment.

According to the embodiments of the disclosure, the disclosure also provides an electronic device, a readable storage medium and a computer program product.

Figure 6:
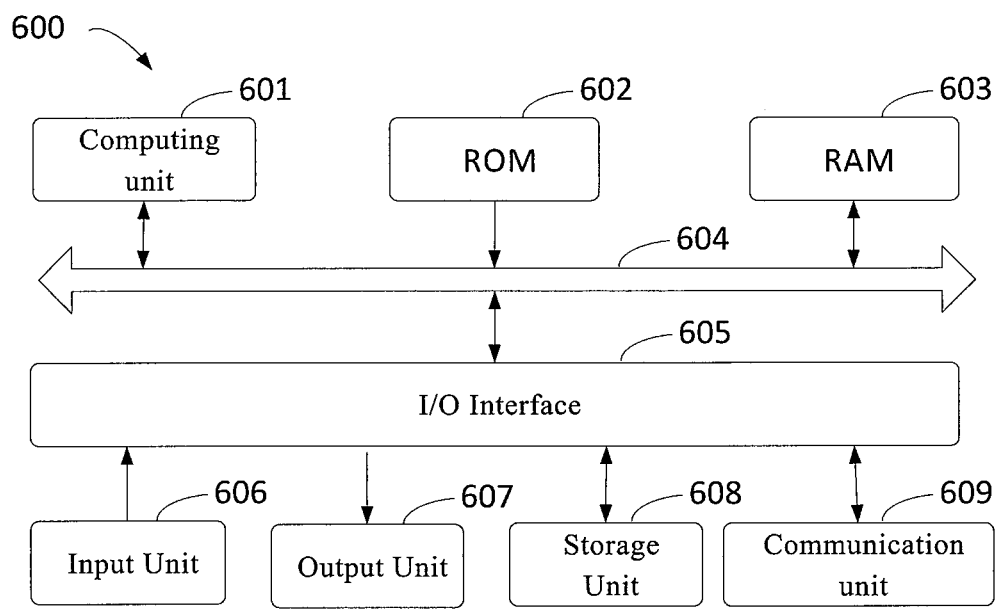
FIG. 6 is a schematic diagram of an electronic device 600 according to an embodiment of the disclosure.

FIG. 6 is a block diagram of an electronic device 600 configured to implement the method according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the device 600 includes a computing unit 601 performing various appropriate actions and processes based on computer programs stored in a read-only memory (ROM) 602 or computer programs loaded from the storage unit 608 to a random access memory (RAM) 603. In the RAM 603, various programs and data required for the operation of the device 600 are stored. The computing unit 601, the ROM 602, and the RAM 603 are connected to each other through a bus 604. An input/output (I/O) interface 605 is also connected to the bus 604.

Components in the device 600 are connected to the I/O interface 605, including: an inputting unit 606, such as a keyboard, a mouse; an outputting unit 607, such as various types of displays, speakers; a storage unit 608, such as a disk, an optical disk; and a communication unit 609, such as network cards, modems, wireless communication transceivers, and the like. The communication unit 609 allows the device 600 to exchange information/data with other devices through a computer network such as the Internet and/or various telecommunication networks.

The computing unit 601 may be various general-purpose and/or dedicated processing components with processing and computing capabilities. Some examples of computing unit 601 include, but are not limited to, a central processing unit (CPU), a graphics processing unit (GPU), various dedicated artificial intelligence (AI) computing chips, various computing units that run machine learning model algorithms, and a digital signal processor (DSP), and any appropriate processor, controller and microcontroller. The computing unit 701 executes the various methods and processes described above. For example, in some embodiments, the method may be implemented as a computer software program, which is tangibly contained in a machine-readable medium, such as the storage unit 608. In some embodiments, part or all of the computer program may be loaded and/or installed on the device 600 via the ROM 602 and/or the communication unit 609. When the computer program is loaded on the RAM 603 and executed by the computing unit 601, one or more steps of the method described above may be executed. Alternatively, in other embodiments, the computing unit 601 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server can be a cloud server, also known as a cloud computing server or a cloud host, which is a host product in the cloud computing service system, to solve the traditional physical host with a Virtual Private Server (VPS) service, which has the defects of difficult management and weak business expansibility. The server can also be a server for a distributed system, or a server that incorporates a blockchain.

It is noted that Artificial Intelligence (AI) is a discipline that studies certain thinking processes and intelligent behaviors (such as learning, reasoning, thinking and planning) that allow computers to simulate life, which has both hardware-level technologies and software-level technologies. Artificial intelligence hardware technology generally includes technologies such as sensors, dedicated artificial intelligence chips, cloud computing, distributed storage, and big data processing. Artificial intelligence software technology generally includes computer vision technology, speech recognition technology, natural language processing technology, and its learning/deep learning, big data processing technology, knowledge map technology and other aspects.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for generating a text, comprising:
obtaining a coding sequence of a first text by coding the first text;
obtaining a controllable attribute of a second text to be generated;
predicting a hidden state of the second text based on the coding sequence of the first text and the controllable attribute of the second text; and
obtaining a second text corresponding to the first text by decoding the coding sequence of the first text based on the hidden state of the second text;
wherein obtaining the controllable attribute of the second text to be generated comprises:
obtaining a target value of the controllable attribute; and
predicting a value of a controllable attribute of each character in the second text based on the target value and codes of each character of the first text in the coding sequence in a case that the controllable attribute is a local attribute, wherein the local attribute is a controllable attribute for attribute control of each character of the second text,
wherein predicting the hidden state of the second text based on the coding sequence of the first text and the controllable attribute of the second text comprises:
obtaining a hidden state of a first character in the second text by fusing the coding sequence and the controllable attribute of the first character of the second text and decoding using a first recurrent neural network; and
obtaining a hidden state of an nth character in the second text by fusing a hidden state of an $(n-1)^{th}$ character in the second text, a controllable attribute of the $n^{th}$ character in the second text, and a code of the nth character in the first text, and decoding using the first recurrent neural network, where n is an integer greater than 1.

2. The method according to claim 1, wherein after obtaining the target value of the controllable attribute, the method further comprises:
determining that the value of the controllable attribute of each character in the second text is the target value in a case that the controllable attribute is a global attribute.

3. The method according to claim 1, wherein obtaining the target value of the controllable attribute comprises:
determining the target value of the controllable attribute by a user operation; or
obtaining the target value by predicting the controllable attribute based on the coding sequence of the first text.

4. The method according to claim 1, wherein obtaining the second text corresponding to the first text by decoding the coding sequence of the first text based on the hidden state of the second text, comprises:
obtaining a code of the first character in the second text by fusing the coding sequence and the hidden state of the first character in the second text, and decoding by using a second recurrent neural network;
obtaining a code of the $n^{th}$ character in the second text by fusing the coding sequence of the first text, the hidden state of the $n^{th}$ character in the second text and a code of the $(n-1)^{th}$ character in the second text, and decoding by using the second recurrent neural network; and
determining the second text based on a code of each character in the second text.

5. The method according to claim 1, wherein predicting the value of the controllable attribute of each character of the second text based on the target value and the code of each character of the first text, comprises:
obtaining a value of the controllable attribute of a first character in the second text by fusing the target value and the coding sequence of the first text, and inputting into a third recurrent neural network; and
obtaining a value of the controllable attribute of the $n^{th}$ character in the second text by fusing the value of the controllable attribute of the $(n-1)^{th}$ character in the second text, the target value and the coding sequence of the first text, and decoding by the third recurrent neural network.

6. An apparatus for generating a text, comprising:
at least one processor and a memory communicatively connected with the at least one processor, wherein the memory stores instructions executable by the at least one processor, and the at least one processor is configured to:
obtain a coding sequence of a first text by coding the first text;
obtain a controllable attribute of a second text to be generated;
predict a hidden state of the second text based on the coding sequence of the first text and the controllable attribute of the second text; and
obtain a second text corresponding to the first text by decoding the coding sequence of the first text based on the hidden state of the second text;
wherein the at least one processor is configured to:
obtain a target value of the controllable attribute; and
predict a value of a controllable attribute of each character in the second text based on the target value and codes of each character of the first text in the coding sequence in a case that the controllable attribute is a local attribute, wherein the local attribute is a controllable attribute for attribute control of each character of the second text;
wherein the at least one processor is configured to:
obtain a hidden state of a first character in the second text by fusing the coding sequence and the controllable attribute of the first character of the second text and decode using a first recurrent neural network; and
obtain a hidden state of an $n^{th}$ character in the second text by fusing a hidden state of an $(n-1)^{th}$ character in the second text, a controllable attribute of the $n^{th}$ character in the second text, and a code of the $n^{th}$ character in the first text, and decode using the first recurrent neural network, where n is an integer greater than 1.

7. The apparatus according to claim 6, wherein the at least one processor is configured to:
determine that the value of the controllable attribute of each character in the second text is the target value in a case that the controllable attribute is a global attribute.

8. The apparatus according to claim 6, wherein the at least one processor is configured to:
determine the target value of the controllable attribute by a user operation; or
obtain the target value by predicting the controllable attribute based on the coding sequence of the first text.

9. The apparatus according to claim 6, wherein the at least one processor is configured to:
obtain a code of the first character in the second text by fusing the coding sequence and the hidden state of the first character in the second text, and decoding by using a second recurrent neural network;
obtain a code of the $n^{th}$ character in the second text by fusing the coding sequence of the first text, the hidden state of the $n^{th}$ character in the second text and a code of the $(n-1)^{th}$ character in the second text, and decoding by using the second recurrent neural network; and determine the second text based on a code of each character in the second text.

10. The apparatus according to claim 6, wherein the at least one processor is configured to:
   obtain a value of the controllable attribute of a first character in the second text by fusing the target value and the coding sequence of the first text, and inputting into a third recurrent neural network; and
   obtain a value of the controllable attribute of the $n^{th}$ character in the second text by fusing the value of the controllable attribute of the $(n-1)^{th}$ character in the second text, the target value and the coding sequence of the first text, and decoding by the third recurrent neural network.

11. A non-transitory computer-readable storage medium storing computer instructions, wherein the computer instructions are configured to make a computer execute the method according to claim 1, and the method comprises:
   obtaining a coding sequence of a first text by coding the first text;
   obtaining a controllable attribute of a second text to be generated;
   predicting a hidden state of the second text based on the coding sequence of the first text and the controllable attribute of the second text; and
   obtaining a second text corresponding to the first text by decoding the coding sequence of the first text based on the hidden state of the second text;
   wherein obtaining the controllable attribute of the second text to be generated comprises:
   obtaining a target value of the controllable attribute; and
   predicting a value of a controllable attribute of each character in the second text based on the target value and codes of each character of the first text in the coding sequence in a case that the controllable attribute is a local attribute, wherein the local attribute is a controllable attribute for attribute control of each character of the second text,
   wherein predicting the hidden state of the second text based on the coding sequence of the first text and the controllable attribute of the second text comprises:
   obtaining a hidden state of a first character in the second text by fusing the coding sequence and the controllable attribute of the first character of the second text and decoding using a first recurrent neural network; and
   obtaining a hidden state of an $n^{th}$ character in the second text by fusing a hidden state of an $(n-1)^{th}$ character in the second text, a controllable attribute of the $n^{th}$ character in the second text, and a code of the $n^{th}$ character in the first text, and decoding using the first recurrent neural network, where n is an integer greater than 1.

* * * * *